3,557,258
O,O-DILOWER ALKYL-2-HALO-1-(HALOMETHOXY-PHENYL)-VINYL PHOSPHATE
Ernst Beriger, Allschwil, and Ladislaus Pinter, Basel, Switzerland, assignors to Ciba Limited, Basel, Switzerland, a company of Switzerland
No Drawing. Filed Jan. 8, 1968, Ser. No. 696,119
Claims priority, application Switzerland, Jan. 18, 1967, 803/67
Int. Cl. A01n 9/36; C07f 9/12
U.S. Cl. 260—951   6 Claims

ABSTRACT OF THE DISCLOSURE

The present invention relates to new phosphoric acid esters of the formula:

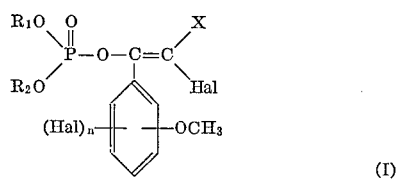

(I)

in which $R_1$ and $R_2$ may be identical or different and each represents a low alkyl, alkenyl, alkoxyalkyl or alkylthioalkyl radical, "Hal" represents a chlorine, a bromine or an iodine atom, X represents a hydrogen or a halogen atom, especially a chlorine or a bromine atom and $n$ stands for 1, 2 or 3, as well as to pesticidal preparations, which contain, as active principle, a phosphoric acid ester as defined above, together with a suitable carrier.

---

The present invention relates to new phosphoric acid esters, and to pesticidal preparations containing them.

The present invention provides pesticidal preparations, which comprise, as active principle, a phosphoric acid ester of the general formula:

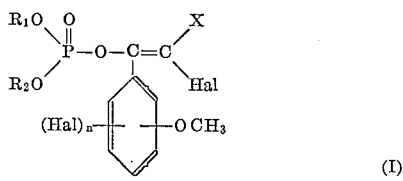

(I)

in which $R_1$ and $R_2$ may be identical or different and each represents a low alkyl, alkenyl, alkoxyalkyl or alkylthioalkyl radical, "Hal" represents a chlorine, a bromine or an iodine atom, X represents a hydrogen or a halogen atom, especially a chlorine or a bromine atom and $n$ stands for 1, 2 or 3, together with a suitable carrier.

The preparations may contain one or more of the following additives: a solvent, a dispersing agent, an emulsifying agent, an adhesive, a binder and/or a thickening agent, and, if necessary, a known pesticide.

Preferably, the active principle is a compound of the general formula:

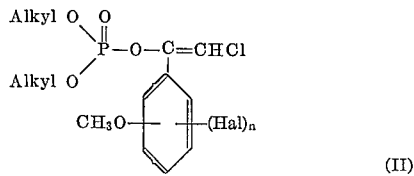

(II)

in which "Hal" represents a chlorine or a bromine atom, $n$ stands for 1 tor 2, but preferably 2, and each "alkyl" represents an alkyl radical containing 1 to 3 carbon atoms, it being possible for one alkyl radical to be identical with or different from the other.

The new preparations because of their broad-spectrum biocidal action, have the special advantage that they can be used for the control of a very wide variety of pests belonging to the animal kingdom.

They may be used not only as insecticides, but also for controlling microorganisms harmful to plants, provided they are applied in a concentration in which they are not phytotoxic. They may, for example, be used to combat fungi, for example, Alternaria solani, Phytopthora infestans and Septoria apii, as well as harmful molluscs, nematodes and the eggs and larvae thereof.

The new active principles of the Formula I or preparations containing such active principles are also highly toxic to various members of the order acarina (mites, ticks and so forth).

The new preparations may also be used as general microbicides, for example, for controlling the various species of Aspergillus, and as insecticides, for example, for the control of midges and flies. Special mention must also be made of their powerful effect against soil-dwelling insects.

The new preparations are especially active against domestic pests and pests harmful to stored foodstuffs.

They are especially suitable for this purpose because of their relatively low mammalian toxicity.

The preparations of the invention can be made up in a very wide variety of forms; for example, they can be used as dusting preparations and emulsions.

Solutions of the compounds of the general Formula I which may be used directly for spraying may be prepared with mineral oil fractions having a high to medium boiling range, for example, Diesel oil or kerosene, coal-tar oils and oils of vegetable or animal origin; and also hydrocarbons, for example, alkylated naphthalenes, and tetrahydronaphthalene, if necessary, with the use of xylene mixtures, cyclohexanols and ketones, and also chlorinated hydrocarbons, for example, trichloroethane, tetrachloroethane, trichloroethylene, trichlorobenzene and tetrachlorobenzene.

Aqueous preparations may be prepared from emulsion concentrates, pastes or wettable powders for sprays by adding water. Suitable emulsifying agents or dispersing agents are, for example, non-ionic products, for example, condensation products obtained from aliphatic alcohols, amines or carboxylic acids having long-chain hydrocarbon radicals containing about 10 to 20 carbon atoms and ethylene oxide, for example, the condensation products obtained from octadecyl alcohol and 25 to 30 mols of ethylene oxide, or that obtained from soybean fatty acid and 30 mols of ethylene oxide, or that obtained from commercial oleylamine and 15 mols of ethylene oxide, or that obtained from dodecylmercaptan and 12 mols of ethylene oxide. Examples of anionic emulsifying agents that may be used are; the sodium salt of dodecylalcohol sulphuric acid ester, the sodium salt of dodecylbenzene sulphonic acid, the potassium or triethanolamine salt of oleic acid or abietic acid or mixtures of these acids, or the sodium salt of a petroleum sulphonic acid. As suitable cationic dispersing agents, there may be mentioned: quaternary ammonium compounds, for example, cetylpyridinium bromide, or dihydroxyethylbenzyldodecylammoniumchloride.

Dusting and strewing preparations may be prepared with solid carriers, for example, talcum, kaolin, bentonite and calcium carbonate, and also with charcoal, cork meal and other materials of vegetable origin. It is also very advantageous to make the preparations in the form of grains. The preparations in their various forms may also contain the usual additives which improve dispersion, adhesion, rain-resistance and penetrating power; substances of the kind mentioned are, for example, fatty acids, resins, glues, casein and alginates.

The preparations of the invention may be used either alone or together with known pesticides, especially insecticides, acaricides, nematicides, bactericides or other fungicides or herbicides.

The compounds of the Formula I have hitherto not been described in the literature. Therefore, the present invention also provides new phosphoric acid esters of the general formula:

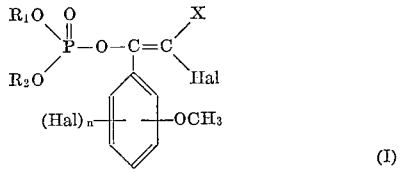

(I)

in which $R_1$ and $R_2$ may be identical or different and each represents a low alkyl, alkenyl, alkoxyalkyl or alkylthioalkyl residue, "Hal" represents a chlorine, a bromine or an iodine atom, X represents a hydrogen or a halogen atom, especially a chlorine or a bromine atom, and $n$ stands for 1, 2 or 3.

The invention also provides a process for the manufacture of the new phosphoric acid esters of the Formula I, wherein a phosphite of the formula:

(III)

in which $R_1$ and $R_2$ have the meanings given above and R represents a low alkyl radical, is reacted with a halogenoacetophenone of the formula:

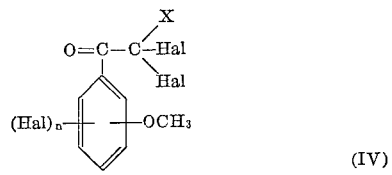

(IV)

in which Hal, X and $n$ have the meanings given above.

Generally, it is possible to work without a solvent, because the phosphite of the Formula III can be used as such.

The following examples illustrate the invention:

EXAMPLE 1

55 parts of triethylphosphite are added during 15 minutes to 76 parts of trichloromethoxyacetophenone (made according to Friedel-Crafts from dichloroacetyl chloride and 4-chloroanisole; B.P. 88 to 90° C./0.1 mm. Hg). The solution is heated for 2 hours at a temperature of 150° C. under reflux and while stirring. Ethyl chloride is formed as a by-product and some of it escapes. The volatile matter and the solvent are evaporated in vacuo, and the residue is O,O-diethyl-2 - chloro - 1 - (chloromethoxyphenyl)-vinyl phosphate, which can be distilled in a high vacuum. B.P. 155 to 169° C./0.07 mm. Hg.

*Analysis.*—Calcd. for $C_{13}H_{17}Cl_2O_5P$ (percent): Cl, 20.5; P, 9.0. Found (percent): Cl, 19.0; P, 9.6.

[Active principle No. 1]

Active principle No. 1 probably corresponds to the following formula:

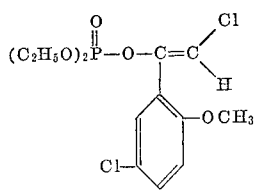

The corresponding dimethyl ester can also be prepared by carrying out the above reaction under superatmospheric pressure [Active principle No. 2].

The following compound can be obtained in an analogous manner from 5-bromo-ω,ω-dichloro-2-methoxyacetophenone (B.P. 122–128/0.1 mm. Hg) and triethylphosphite:

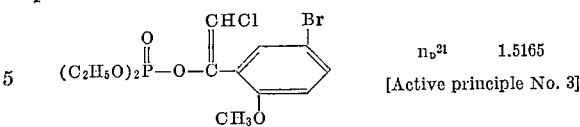

$n_D^{21}$ 1.5165

[Active principle No. 3]

The following compound can be obtained in an analogous manner from ω,ω-4,5-tetrachloro-2-methoxyacetophenone (B.P. 110° C./0.1 mm. Hg) and trimethylphosphite:

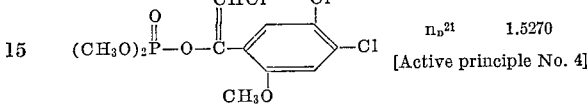

$n_D^{21}$ 1.5270

[Active principle No. 4]

The following compound can be obtained in an analogous manner from ω,ω-4,5-tetrachloro-2-methoxyacetophenone and triethylphosphite:

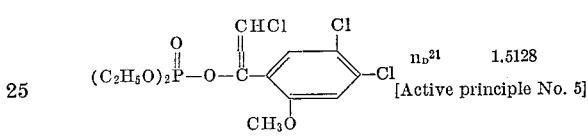

$n_D^{21}$ 1.5128

[Active principle No. 5]

The following compound can be obtained in an analogous manner from ω,ω-2,5-tetrachloro-4-methoxyacetophenone (B.P. 118–120/0.1 mm. Hg) and trimethylphosphite:

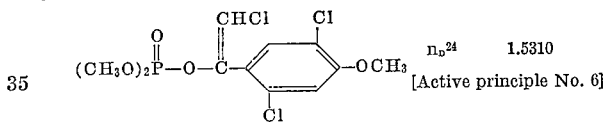

$n_D^{24}$ 1.5310

[Active principle No. 6]

The following compound can be obtained in an analogous manner from ω,ω-2,5-tetrachloro-4-methoxyacetophenone and triethylphosphite:

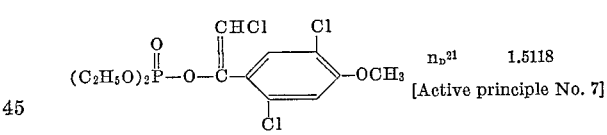

$n_D^{21}$ 1.5118

[Active principle No. 7]

The following compound can be obtained in an analogous manner from ω,ω,ω - 2,5 - pentachloro-4-methoxyacetophenone (B.P. 118° C./0.01 mm. Hg) and trimethylphosphite:

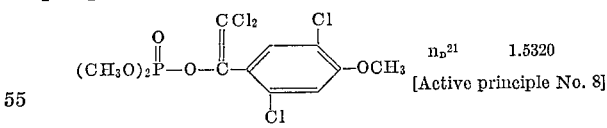

$n_D^{21}$ 1.5320

[Active principle No. 8]

The following compound can be obtained in an analogous manner from ω,ω,ω - 2,5 - pentachloro-4-methoxyacetophenone and triethylphosphite:

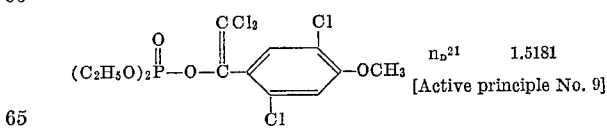

$n_D^{21}$ 1.5181

[Active principle No. 9]

All the halogenomethoxyacetophenones given above were prepared according to Friedel-Crafts from the corresponding halogenoanisole and dichloro- or trichloroacetyl chloride.

EXAMPLE 2

2 parts of the active principle described in Example 1 are sprayed on to 98 parts of kaolin, and the whole is ground to a homogeneous dust.

EXAMPLE 3

Wettable powder 25 parts of the active principle described in Example 1 are sprayed on to 73 parts of kieselguhr and then the whole, together with 2 parts of naphthalenesulphonic acid, is ground to a homogeneous mass. Water is added to the mass until the desired degree of concentration of active principle is attained.

EXAMPLE 4

Emulsion 20 parts of the active principle described in Example 1 are dissolved in 75 parts of xylene, and then 5 parts of castor oil butylester sulphonate are added.

The solution so obtained is suspended in water, the amount of water being such that the desired degree of concentration of active principle is obtained.

EXAMPLE 5

40 grams of the active principle of Example 1 are dissolved in 60 cc. of a 25% solution of a mixture of equal parts of a condensation product derived from tertiary-octylphenol and about 10 moles of ethylene oxide and calcium dodecylbenzenesulphonate in xylene, and the whole is bulked to 100 cc. with xylene. An emulsion concentrate is thus obtained which can be diluted with water as required and which forms stable emulsions.

EXAMPLE 6

The active principles 1, 3, 4, 5, 6, 7, 8 and 9 were formulated in dusts in decreasing concentrations and tested on pests harmful to stored food, and on plant pests. The following results were obtained:

ACTIVE PRINCIPLES
[100% kill in 24 hours (X grams per square metre]

| | 1 | 3 | 4 | 5 | 6 | 7 | 8 | 9 |
|---|---|---|---|---|---|---|---|---|
| Fly | 12.5 | 12.5 | 25 | 25 | 25 | 25 | 50 | 50 |
| Grain weevil | 12.5 | 3 | — | — | 6.25 | — | — | — |
| Aphis | 12.5 | — | — | — | — | — | — | — |
| O. gonost | 3 | 25 | — | — | — | 25 | — | — |
| Prodenia litura | 12.5 | — | — | — | — | — | — | — |
| E. varivest | 12.5 | 12.5 | — | — | — | 6 | — | — |
| L. migrat | — | — | — | — | — | — | — | — |
| T. telarius | 12.5 | — | 50 | — | — | — | — | — |
| T. urticae | — | 25 | — | — | — | — | — | — |
| German cockroach | 12.5 | 25 | 100 | 100 | 25 | 100 | — | — |
| American cockroach | 50 | 50 | 100 | 100 | 50 | 50 | — | — |
| Russian cockroach | 25 | 50 | 100 | — | 50 | 50 | — | — |
| Meal beetle | 50 | — | — | 100 | — | — | — | — |
| Meal beetle larva | 50 | — | — | — | — | — | — | — |
| Bacon beetle | 100 | — | 100 | — | 25 | — | — | — |
| Bacon beetle larva | 100 | 50 | 100 | — | 25 | — | — | — |
| Rhodnius larva | 25 | 50 | 100 | 100 | 50 | 50 | — | — |
| Skin beetle larva | — | — | 100 | 100 | 50 | — | — | — |
| Cricket | — | — | 100 | 100 | 100 | — | — | 100 |

— = not tested.

EXAMPLE 7

Active principles 1, 3, 6 and 7 have the following lethal concentrations in p.p.m. (within 24 hours) in respect of the following pests:

| | 1 | 3 | 6 | 7 |
|---|---|---|---|---|
| Ticks, *Rhipicephalus bursa* | 10 | 100 | 10 | 10 |
| Blowfly, (*Lucilia*) | 50 | 12 | 12 | 2 |
| *Aedes* larva | 0.5 | 0.4 | 0.05 | 0.05 |

Active principle No. 6 displays surprisingly low mammalian toxicity (LD50 of 515 mg./kg. when administered orally to rats).

What is claimed is:

1. Phosphoric acid esters of the formula:

$$\begin{array}{c} R_1O \\ R_2O \end{array}\!\!>\!\!\overset{O}{\underset{\|}{P}}-O-C\!=\!C\!<\!\!\begin{array}{c} X \\ Hal \end{array}$$
$$(Hal)_n\!-\!\!\langle\!\!\bigcirc\!\!\rangle\!-\!OCH_3$$

in which $R_1$ and $R_2$ may be identical or different and each represents low alkyl, "Hal" represents a chlorine, or a bromine atom, X represents a hydrogen or a chlorine atom, and $n$ stands for 1 or 2.

2. Compounds as claimed in claim 1, wherein X represents a chlorine atom.

3. A compound as claimed in claim 1, wherein the phosphoric acid ester has the formula:

$$(C_2H_5O)_2\overset{O}{\underset{\|}{P}}-O-C\!=\!C\!<\!\!\begin{array}{c} Cl \\ H \end{array}$$
$$Cl\!-\!\!\langle\!\!\bigcirc\!\!\rangle\!-\!OCH_3$$

4. A compound as claimed in claim 1, wherein the phosphoric acid ester has the formula:

$$(C_2H_5O)_2\overset{O}{\underset{\|}{P}}-O-\overset{CHCl}{\underset{\|}{C}}\!\!-\!\!\langle\!\!\bigcirc\!\!\rangle\!\!\begin{array}{c} Br \\ CH_3O \end{array}$$

5. A compound as claimed in claim 1, wherein the phosphoric acid ester has the formula:

$$(CH_3O)_2\overset{O}{\underset{\|}{P}}-O-\overset{CHCl}{\underset{\|}{C}}\!\!-\!\!\langle\!\!\bigcirc\!\!\rangle\!\!-\!OCH_3$$
$$\qquad\qquad\qquad Cl$$

6. A compound as claimed in claim 1, wherein the phosphoric acid ester has the formula:

$$(C_2H_5O)_2\overset{O}{\underset{\|}{P}}-O-\overset{CHCl}{\underset{\|}{C}}\!\!-\!\!\langle\!\!\bigcirc\!\!\rangle\!\!-\!OCH_3$$
$$\qquad\qquad\qquad Cl$$

References Cited

UNITED STATES PATENTS 3,116,201  12/1963  Whetstone et al. ____ 260—951X

CHARLES B. PARKER, Primary Examiner

A. H. SUTTO, Assistant Examiner

U.S. Cl. X.R.

260—969; 424—224